(12) United States Patent
Müller et al.

(10) Patent No.: US 8,227,949 B2
(45) Date of Patent: Jul. 24, 2012

(54) LINEAR ACTUATOR

(75) Inventors: Thomas Müller, Dresden (DE);
Andreas Kurtz, Glashütte/OT Hausdorf (DE); Klaus Bachmann, Dresden (DE)

(73) Assignee: Saia-Burgess Dresden GmbH, Dresden (DE)

( * ) Notice: Subject to any disclaimer, the term of this patent is extended or adjusted under 35 U.S.C. 154(b) by 346 days.

(21) Appl. No.: 12/702,423

(22) Filed: Feb. 9, 2010

(65) Prior Publication Data

US 2010/0213776 A1 Aug. 26, 2010

(30) Foreign Application Priority Data

Feb. 24, 2009 (DE) .......................... 10 2009 010 085

(51) Int. Cl.
*H02K 5/00* (2006.01)

(52) U.S. Cl. .......................................... 310/89; 310/83

(58) Field of Classification Search ............... 310/88, 310/89, 83

See application file for complete search history.

(56) References Cited

U.S. PATENT DOCUMENTS

| 6,861,775 | B2 * | 3/2005 | Lau ................................. | 310/71 |
| 7,375,446 | B2 * | 5/2008 | Suzuki et al. ..................... | 310/86 |
| 7,576,461 | B2 * | 8/2009 | Wong et al. ...................... | 310/89 |

FOREIGN PATENT DOCUMENTS

| DE | 2230707 | | 1/1974 |
| DE | 19807147 | A1 | 8/1999 |
| EP | 1237255 | A1 | 9/2002 |

* cited by examiner

*Primary Examiner* — Nguyen N Hanh

(74) *Attorney, Agent, or Firm* — Norris McLaughlin & Marcus, P.A.

(57) ABSTRACT

The invention relates to a linear actuator (1), at least including a stator (3) that is placed within a cartridge-like casing (2), a bearing ring (4) with a bearing seat for mounting a rotor (5) with an antifriction bearing (6), a spindle (7) that on its drive side (7.1) is together with the rotor (5) designed as motion transformer to transform the rotary motion into a translatory motion and a flange (9) that closes the casing (2) on the output side (8) of the linear actuator (1), the flange (9) being equipped with an anti-rotation locking device for the spindle output side (7.2) that penetrates the flange (9). According to the invention the cartridge-like casing (2) is provided with several formed bending tongues (10.1, 10.2), whereby in assembled condition first bending tongues (10.1) engage with groove-like recesses (11) of the bearing ring (4) of the anti-friction bearing (6) and second bending tongues (10.2) engage with groove-like recesses (11) of the flange (9) so that all components (3, 4, 5, 7 and 9) placed in the casing are tensioned against each other without further connection techniques being required.

10 Claims, 3 Drawing Sheets

LINEAR ACTUATOR

BACKGROUND OF THE INVENTION (1) Field of the Invention

The invention relates to a linear actuator, at least including a stator that is placed within a cartridge-like casing, a bearing seat for mounting a rotor with an antifriction bearing, the bearing seat in assembled condition being located behind the stator, a spindle that on the drive side thereof is together with the rotor designed as motion transformer to transform the rotary motion into a translatory motion and a flange that closes the casing on the output side of the linear actuator, the flange equipped with an anti-rotation locking device for the spindle output side that penetrates the flange.

(2) Description of Related Art

Generally, the axial, or face-side, respectively, closure of linear actuators, particularly of linear stepper motors and the necessary support of thrust forces are achieved by laser or spot welding of the stator packet that is placed within the casing and the flange that is placed on the output side of the linear stepper motor. Examples of prior art are the motors of the series 20DAM made by DANAHER, the motors of the series PFCL25/35 made by NPM and the motors of the series LSP15/25/35 made by NANOTEC.

Other motor manufacturers such as NMB (PL25), SAIA (UBL/ELD) or FDK (VLL30) weld the stator packet and connect the flange by means of bending tongues.

The HSI company mounts the flange to the stator packet of the series 20000 motors instead of using bending tongues, by material caulking at the casing, with additionally welding the stator packet.

Solutions by the applicant are also known where the ball bearing is axially locked by ultrasonic welding and the flange attached to the stator by using bending tongues. Connection of two plastic parts can instead of using the ultrasonic welding process also be made by rotary friction welding.

The traditional solution to screw the stator and flange together is chosen by HSI and MOONS, with the hybrid stepper motors made in square design that requires more installation space. In the rotary motors by NMB the stator packet is also fixed by over-molding with a plastic material; in a motor of the applicant the flange is attached to the stator by clinching.

A particular disadvantage of the above mentioned connection methods is, first, the high capital cost for installing the expensive production lines with the associated production steps. Second, the fixtures and machines for the frequently used laser, spot or ultrasonic welding processes need very intensive maintenance, furthermore being susceptible to faults under certain environmental conditions.

BRIEF SUMMARY OF THE INVENTION

The object of the present invention is to propose a linear actuator that can be produced more cost-effectively, with the different components being fixable especially cost-effectively and efficiently.

The linear actuator according to the concept of the invention includes at least one stator that is placed within a cartridge-like casing, a bearing seat for mounting a rotor with an antifriction bearing the bearing seat in assembled condition being located behind the stator, a spindle that on the drive thereof side is together with the rotor designed as motion transformer to transform the rotary motion into a translatory motion, and a flange that on the output side of the linear actuator closes the casing, the flange equipped with an anti-rotation locking device for the spindle output side that penetrates the flange. According to the invention, the cartridge-like casing is provided with several formed bending tongues, whereby in assembled condition first bending tongues engage with groove-like recesses of the bearing seat of the antifriction bearing and second bending tongues engage with groove-like recesses of the flange so that all components placed in the casing are tensioned against each other without further connection techniques being required.

Due to the double bending tongue closure according to the invention, first, the stator packet is fixed by means of the bearing seat of the antifriction bearing that in assembled condition is located behind the stator packet and the antifriction bearing that engages with the bearing seat is held in a defined position. Second, the rotor is indirectly mounted through the direct fixing of the flange by use of the drive side of the spindle that is in active connection to the nut of the rotor.

In terms of the invention, all mechanical connections are interpreted as connection techniques, such as force-closed, form-closed or material-closed connections. The only required connection technique according to the teaching of the invention is a combined force- and form-closed connection between the single bending tongues of the casing and the associated groove-like recesses of the components to be fixed. The rest of the components are enclosed sandwich-like between the components to be fixed and held in position by at least partial engagement of preferably adjacent components.

Because the components of the linear actuator according to the invention are in direction of assembly mounted after each other but also, partly, engaging with each other, it necessarily results that the formed bending tongues of the cartridge-like casing engage with the groove-like recesses, which are placed at different positions, of the bearing ring and the flange.

Preferably, the antifriction bearing used is a radial ball bearing that serves to support the radial and axial forces of the rotor.

In a first preferred embodiment of the invention the formed bending tongues extend as strip-like segments in direction of the longitudinal axis of the casing, the segments established due to a face that is profiled in form of a castellation, or silhouette, respectively. Starting from a cartridge-like casing, during manufacture of said casing, a castellation, or profile, respectively, is made on one face, preferably on the face that corresponds to the output side of the linear actuator, the castellation or profile comprising strip-like bending tongues with cut-outs between said tongues.

In a second preferred embodiment of the invention the formed bending tongues are situated on the circumferential surface of the casing, said bending tongues manufactured as segments of the circumferential surface by tongue-like or hook-like cuts. That means that the cartridge-like casing essentially corresponds to a hollow cylinder that on its circumferential surface comprises milled or otherwise made material cut-outs.

It is also relevant to the invention that the cartridge-like casing can be provided with further established or formed bending tongues that distally extend from the casing in assembled condition with the object of accepting or arresting components that are placed outside the linear actuator, such as sensors or other bearings. Said components can be attached at the circumferential surface or at that face of the cartridge-like casing that is opposite to the output side.

Depending on the component to be attached by means of its groove-like recesses as well as the position of the component within the casing the bending tongues of the casing each have different lengths, widths and geometries.

In practice, four short first bending tongues are provided for fixing the bearing seat of the antifriction bearing while four long second bending tongues are provided for fixing the flange, with the bending tongues for reasons of optimal force distribution being placed homogeneously distributed over a periphery with short and long bending tongues being arranged alternately. The short first bending tongues can further be designed narrow, because they only have to ensure the attachment of a nearer component, namely the bearing seat of the antifriction bearing. By contrast, longer and wider bending tongues are provided for attaching components that are positioned more distantly, here the flanges.

To achieve form- and force closure the bending tongues of the casing that engage with the groove-like recesses are bent, upset, twisted or otherwise deformed. Thus, the components are mounted by bending and tensioning of the bending tongues in the accordingly associated groove-like recesses.

In a particularly advantageous further embodiment of the invention a ring-shaped spring element is placed between the antifriction bearing and the anti-rotation locking device of the flange in order to create an additional preload during assembly of the linear actuator.

As mentioned above, the face side of the casing that corresponds to the output side of the linear actuator is closed using a flange. But on the face of the casing opposite to the output side a cover is placed with a plain bearing seat for the rotor said cover in the course of the assembly of the linear actuator being inserted into the cartidge-like casing.

To ensure an only small coaxiality deviation between stator and rotor, which involves a narrow air gap and a high motor performance resulting therefrom, mounting the stator packet on a mandrel is advantageous. Thereby the plain bearing seat in the cover, the inner diameter of the stator packet and the antifriction bearing seat in the bearing ring are centered to each other. Subsequently, the four short, narrow bending tongues of the cartridge-like casing are bent into the groove-like recesses of the bearing ring with bearing seat so that a compact stator is fabricated.

With the diameter ratios Ø plain bearing seat cover N<stator inner Ø<bearing seat outer Ø ball bearing being realized by design it is possible first to build the stator and then to assemble the complete rotor and the flange with anti-rotation locking device.

The significant advantages and features of the invention over prior art essentially are:
 Based on the (double) bending tongue closure of the cartridge-like casing and the associated groove-like recesses of chosen components as the only connection technique used the devices for manufacturing a linear actuator in the shop can be designed particularly simple and robust;
 The bending tongue closure does not require additional fixing means or assembly auxiliaries, because the bending tongues are established as segments of the cartridge-like casing;
 Simply designed production lines for the manufacture of a cartridge-like casing with bending tongues reduce time-consuming maintenance operations and maintenance intervals as well; and
 The little demands of the staff who operate such simply structured machines for manufacture of a cartridge-like casing with bending tongues according to the invention reduce the reject rate and increase the operational reliability.

The aims and advantages of the present invention will become apparent upon carefully reading the following detailed description of the here preferred, non-limiting exemplary embodiments of the invention in combination with the accompanying drawings in which show:

DETAILED DESCRIPTION OF THE INVENTION

Figure 1:
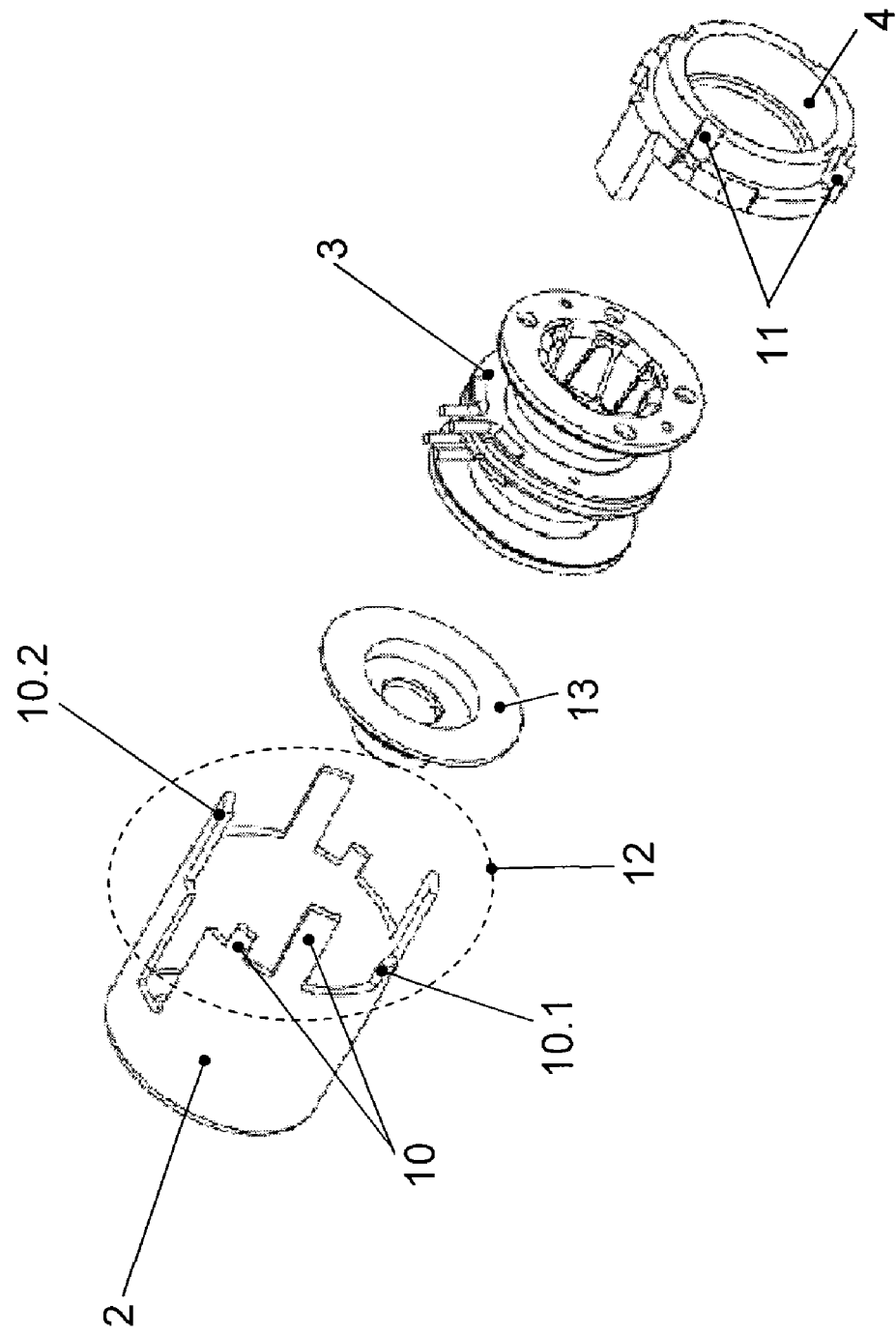
FIG. 1: an explosive representation of the stator side of the linear actuator with casing, stator and bearing ring.

FIG. 1 shows an explosive representation of the stator side of the linear actuator 1 with casing 2, stator 3 and bearing ring 4. The cartridge-like casing 2 according to the invention includes a first face side, where a cover 13 with a plain bearing seat is placed. Said plain bearing seat supports the plain bearing 14 shown in FIG. 2 of the rotor 5 on the first face of the rotor 5. In direction of assembly the stator packet comprising four stator sheets and two stator coils, or the stator 3, respectively, is placed on the cover 13. In assembled condition a bearing ring 4 with bearing seat for accepting the rotor 5 with antifriction bearing 6 is arranged following the stator 3. The cartridge-like casing 2 includes eight formed bending tongues 10.1, 10.2 that all extend as strip-like segments in direction of the longitudinal axis of the casing 2. Said segments are established by the profile-like face in form of a castellation, or silhouette, respectively. Four short first bending tongues 10.1 are provided for fixing the bearing seat 4 of the antifriction bearing 6 of the rotor 5, four long second bending tongues 10.2 are provided for fixing the flange 9 shown in FIG. 2. All eight bending tongues 10.1, 10.2 are placed homogeneously distributed over a common periphery for reasons of optimal force distribution, with short and long bending tongues 10.1, 10.2 being arranged alternately. The bearing ring 4 with bearing seat provided for the antifriction bearing 6 of the rotor 5 includes four groove-like recesses 11 homogeneously distributed over a periphery that each are assigned to one of the four short, narrow bending tongues 10.1 of the cartridge-like casing 2. To achieve form- and force closure the four short bending tongues 10.1 of the casing 2 that engage with the groove-like recesses 11 of the bearing ring 4 are deformed. In this way the position of the stator 3 in the casing 2 and the location of the bearing ring 4 with bearing seat are exactly defined. A completely assembled stator side of the linear actuator 1 is shown in FIG. 2.

Figure 2:
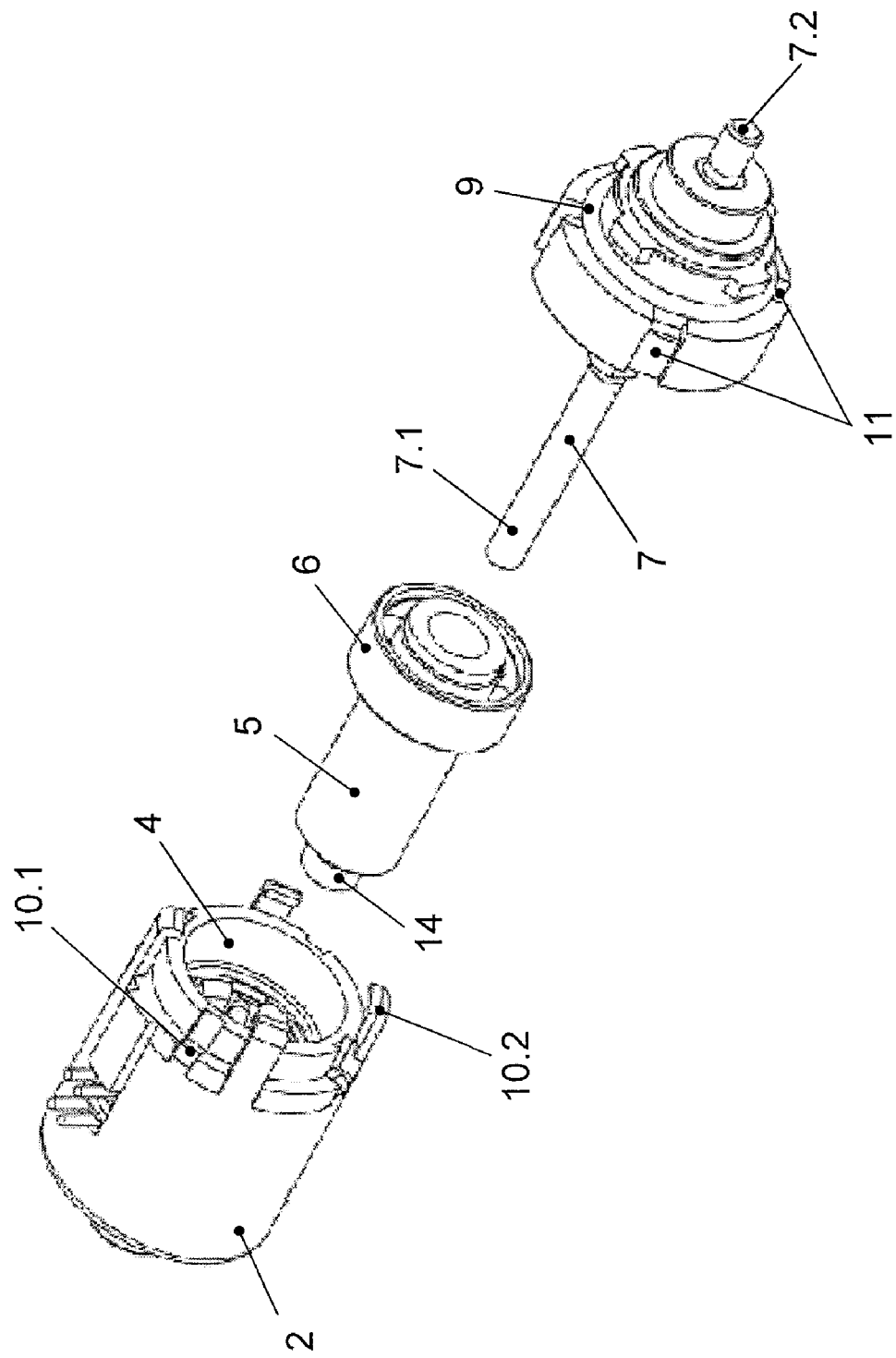
FIG. 2: an explosive representation of the assembled stator side and the rotor side of the linear actuator with rotor and flange.

FIG. 2 shows an explosive representation of the completely assembled stator side and the not assembled rotor side of the linear actuator 1 with rotor 5 and flange 9. In the area of a first face the rotor 5 has a plain bearing 14 that in assembled condition supports to the plain bearing seat of the cover 13 shown in FIG. 1. The opposite side of the rotor 5 comprises an antifriction bearing 6 established as radial ball bearing that is established complementary to the bearing seat 4 of the bearing ring and also supports thereto. Further, the rotor 5 is provided with a nut, which is only indicated, that as part of a motion transformer is established for transforming the rotary motion into a translatory motion, such as a spindle/nut system. The drive side 7.1 of a spindle 7, designed to have a thread, engages with the nut, the spindle 7 shown with its drive side 7.2 penetrating the flange 9. The flange 9 in its turn includes a bayonet ring that is arranged on the left side of the flange 9, as seen by the observer, and an anti-rotation locking device, shown only indicated, for the spindle. The bayonet ring includes four groove-like recesses 11, that are homogeneously distributed over a periphery, with that the four long and wider bending tongues 10.2 of the cartridge-like casing 2 in assembled condition according to FIG. 3 engage by form and force closure.

Figure 3:
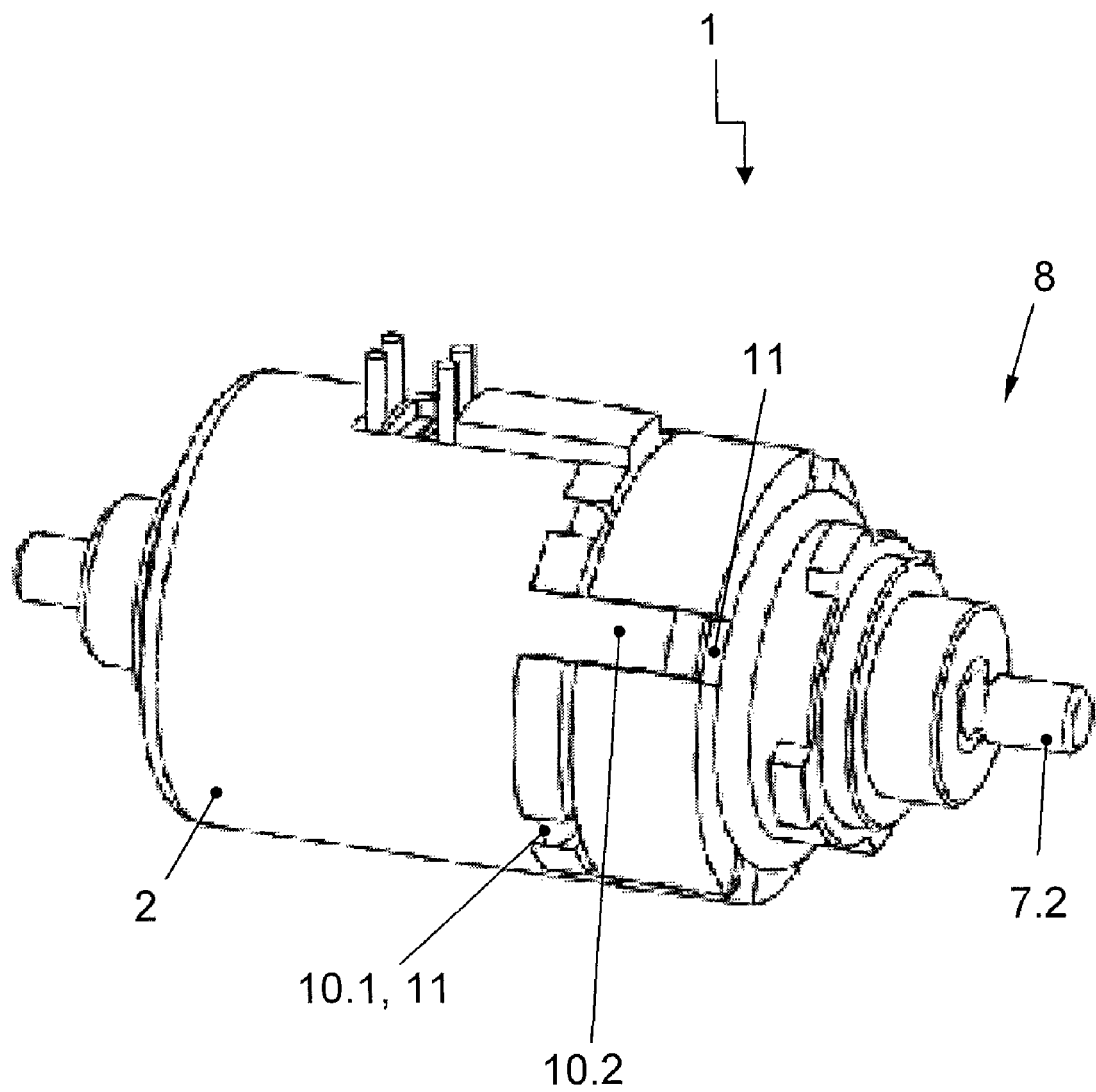
FIG. 3: a perspective representation of a complete linear actuator.

In FIG. 3 a perspective representation of a complete linear actuator 1 is shown. As it is seen, the four short, narrow bending tongues 10.1 engage with the four associated groove-like recesses 11 of the bearing ring 4 while the four long, wider bending tongues 10.2 of the cartridge-like casing 2 engage with the four groove-like recesses 11 of the flange 9 in the area of the bayonet ring thereof by form and force closure. By use of this double bending tongue closure according to the invention all essential components 3, 4, 5, 7 and 9 of the linear actuator 1 are tensioned each to the other in the casing 2 and placed relative to each other to exactly defined dimensions. No further connection techniques in addition to the bending tongues 10 according to the invention are required so that manufacture of a linear actuator 1 is made much simpler and more cost-effective compared with the linear actuators of prior art.

It is obvious that instead of two times four bending tongues 10.1, 10.2 also two times only three bending tongues 10.1, 10.2 and associated groove-like recesses 11 can be provided that, then, are arranged at an angle of 120° to each other, without leaving the inventive way of the applicant.

NOMENCLATURE 1 linear actuator
2 casing
3 stator
4 bearing ring with bearing seat
5 rotor
6 antifriction bearing
7 spindle
7.1 drive side
7.2 output side
8 drive side of the linear actuator
9 flange with anti-rotation locking device
10 bending tongues
10.1 first bending tongue
10.2 second bending tongue
11 groove-like recess
12 castellation, or silhouette
13 cover
14 plain bearing

The invention claimed is:
1. A linear actuator (1) comprising
a stator (3) placed within a cartridge-like casing (2),
a bearing ring (4), in assembled condition being located behind the stator (3),
a bearing seat for mounting a rotor (5) with an antifriction bearing (6),
a spindle (7) which on a drive side (7.1) thereof together with the rotor (5) is established as motion transformer to transform the rotary motion into a translatory motion and
a flange (9) which closes the casing (2) on an output side (8) of the linear actuator (1),
the flange (9) being equipped with an anti-rotation locking device for the spindle output side (7.2) which penetrates the flange (9),
wherein the cartridge-like casing (2) is provided with several formed bending tongues (10.1, 10.2), and wherein, in assembled condition, a first bending tongue (10.1) engages with groove-like recesses (11) of the bearing ring (4) of the antifriction bearing (6) and a second bending tongue (10.2) engages with groove-like recess (11) of the flange (9) so that all components (3, 4, 5, 7 and 9) placed in the casing (2) are tensioned against each other without further connection techniques being required.

2. The linear actuator (1) according to claim 1, wherein the formed bending tongues (10.1, 10.2) of the cartridge-like casing (2) engage with the groove-like recesses (11), placed at different positions, of the bearing ring (4) and the flange (9).

3. The linear actuator (1) according to claim 1, wherein the formed bending tongues (10.1, 10.2) extend as strip-like segments in direction of the longitudinal axis of the casing (2), wherein the segments establish due to a face profiled in form of a castellation, or silhouette, respectively.

4. The linear actuator (1) according to claim 1, wherein the formed bending tongues (10) are disposed on the circumferential surface of the casing (2), said bending tongues (10) is formed as segments of the circumferential surface by tongue-like or hook-like cuts.

5. The linear actuator (1) according to claim 1, wherein the cartridge-like casing (2) is provided with additional formed bending tongues (10) which, when assembled, extend distally from the casing (2) and thereby accepting or fixing components which are placed outside the linear actuator (1), such as sensors or other bearings.

6. The linear actuator (1) according to claim 1, wherein, depending on the component to be attached (4, 9) and the position thereof, the bending tongues (10.1, 10.2) of the casing (2) each have different lengths, widths and geometries.

7. The linear actuator (1) according to claim 1, wherein, for fixing the bearing ring (4) with bearing seat of the antifriction bearing (6), four short first bending tongues (10.1) are provided, while for fixing the flange (9) four long second bending tongues (10.2) are provided, for reasons of optimal force distribution are placed homogeneously distributed over a periphery with short and long bending tongues (10.1, 10.2) being arranged alternately.

8. The linear actuator (1) according to claim 1, wherein for achieving a form- and force closure the bending tongues (10.1, 10.2) of the casing (2) which engage with the groove-like recesses (11) are bent, upset, twisted or otherwise deformed.

9. The linear actuator (1) according to claim 1, wherein between the antifriction bearing (6) and the anti-rotation locking device of the flange (9) a ring-shaped spring element is placed in order to create an additional preload during assembly of the linear actuator (1).

10. The linear actuator (1) according to claim 1, wherein on the face (8) of the linear actuator (1) opposite to the output side, a cover (13) with a plain bearing seat for the rotor (5) is provided, with the cover (13) being inserted into the cartridge-like casing (2) in the course of the assembly of the linear actuator (1).

* * * * *